US 12,479,499 B2

(12) United States Patent
Kimura

(10) Patent No.: US 12,479,499 B2
(45) Date of Patent: Nov. 25, 2025

(54) ELECTRIC POWER STEERING APPARATUS, ELECTRIC POWER STEERING APPARATUS CONTROL METHOD, AND STEERING CONTROL DEVICE

(71) Applicant: HITACHI ASTEMO, LTD., Hitachinaka (JP)

(72) Inventor: Makoto Kimura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 142 days.

(21) Appl. No.: 18/576,227

(22) PCT Filed: Jun. 14, 2022

(86) PCT No.: PCT/JP2022/023787
§ 371 (c)(1),
(2) Date: Jan. 3, 2024

(87) PCT Pub. No.: WO2023/281990
PCT Pub. Date: Jan. 12, 2023

(65) Prior Publication Data
US 2024/0326901 A1    Oct. 3, 2024

(30) Foreign Application Priority Data
Jul. 9, 2021  (JP) .................. 2021-114046

(51) Int. Cl.
*B62D 5/00* (2006.01)
*B62D 5/04* (2006.01)
*H02P 27/00* (2006.01)

(52) U.S. Cl.
CPC ......... *B62D 5/0484* (2013.01); *B62D 5/0493* (2013.01); *H02P 27/00* (2013.01)

(58) Field of Classification Search
CPC .. B62D 5/0484; B62D 5/0493; B62D 5/0403; B62D 5/046; B62D 5/04; B62D 5/00;
(Continued)

(56) References Cited

U.S. PATENT DOCUMENTS 3,858,116 A * 12/1974 Friedl .................. H04B 14/026
  318/16
4,152,634 A * 5/1979 Penrod ...................... H02P 1/22
  361/13

(Continued)

FOREIGN PATENT DOCUMENTS

JP    2007-210607 A    8/2007

OTHER PUBLICATIONS

International Search Report dated Aug. 2, 2022 issued in International Application No. PCT/JP2022/023787, with English translation, 4 pages.
(Continued)

*Primary Examiner* — Phutthiwat Wongwian
*Assistant Examiner* — Sherman D Manley
(74) *Attorney, Agent, or Firm* — FOLEY & LARDNER LLP

(57) ABSTRACT

An electric power steering apparatus according to the present invention includes a first control device that is capable of controlling a first actuator of a steering device, a second control device that is capable of controlling a second actuator of the steering device, and a third control device that is capable of switching connection to, and disconnection from, at least one of the first actuator and the second actuator. When a failure occurs in the first control device, the first control device is disconnected from the first actuator, and the third control device is connected to the first actuator. When a failure occurs in the second control device, the second control device is disconnected from the second actuator, and
(Continued)

the third control device is connected to the second actuator. In this way, even when a failure occurs in one of a plurality of control devices, reduction in total output of electric motors can be prevented.

20 Claims, 7 Drawing Sheets

(58) Field of Classification Search
CPC . B60R 16/03; B60Y 2306/13; B60Y 2306/15; H02P 27/00
See application file for complete search history.

(56) References Cited

U.S. PATENT DOCUMENTS

| | | | | |
|---|---|---|---|---|
| 4,323,827 A * | 4/1982 | Young | ................... | F16H 61/32 318/446 |
| 6,548,969 B2 * | 4/2003 | Ewbank | ................. | B62D 5/003 180/402 |
| 6,889,792 B1 * | 5/2005 | Fardoun | ................. | B60R 25/20 180/443 |
| 6,904,346 B2 * | 6/2005 | Higashi | ................ | B62D 5/0484 180/443 |
| 7,130,728 B2 * | 10/2006 | Suzuki | .................. | B62D 6/008 180/413 |
| 8,571,757 B2 * | 10/2013 | Ogawa | .................. | B62D 5/008 180/443 |
| 8,660,755 B2 * | 2/2014 | Kuroda | ................ | B62D 5/0481 180/443 |
| 9,231,513 B2 * | 1/2016 | Baba | ........................ | H02P 25/22 |
| 9,369,068 B2 * | 6/2016 | Oyori | ..................... | G05B 11/38 |
| 9,806,643 B2 * | 10/2017 | Oyama | ................ | B62D 5/0487 |
| 11,377,146 B2 * | 7/2022 | Fujimoto | ............... | B62D 5/006 |
| 11,565,744 B2 * | 1/2023 | Kuramitsu | ............ | H02P 29/028 |
| 11,584,433 B2 * | 2/2023 | Akutsu | ................ | B62D 7/1581 |
| 11,691,666 B2 * | 7/2023 | Matsumura | .............. | B62D 5/12 701/41 |
| 11,929,699 B2 * | 3/2024 | Park | ........................ | H02P 29/50 |
| 11,979,103 B2 * | 5/2024 | Arafat | ..................... | H02P 25/20 |
| 12,110,068 B2 * | 10/2024 | Kudanowski | ........ | B62D 5/0484 |
| 12,325,471 B2 * | 6/2025 | Kimura | .................. | B62D 5/003 |
| 2003/0098197 A1 * | 5/2003 | Laurent | .................... | H02K 7/06 180/401 |
| 2005/0159866 A1 * | 7/2005 | Takeuchi | ............... | B62D 5/003 180/443 |
| 2013/0299271 A1 * | 11/2013 | Endo | .................... | B62D 5/0487 180/446 |
| 2014/0009093 A1 * | 1/2014 | Suzuki | .................... | H02P 25/22 318/400.02 |
| 2015/0360715 A1 * | 12/2015 | Shimizu | ............... | B62D 5/0484 701/43 |
| 2020/0021233 A1 * | 1/2020 | Kimura | ................ | B62D 5/0484 |
| 2021/0226574 A1 * | 7/2021 | Kimura | ................ | H02M 7/493 |

OTHER PUBLICATIONS

International Preliminary Report on Patentability dated Jan. 18, 2024 issued in International Application No. PCT/JP2022/023787, with English translation, 10 pages.

* cited by examiner

ELECTRIC POWER STEERING APPARATUS, ELECTRIC POWER STEERING APPARATUS CONTROL METHOD, AND STEERING CONTROL DEVICE

TECHNICAL FIELD

The present invention relates to an electric power steering apparatus, to an electric power steering apparatus control method, and to a steering control device.

BACKGROUND ART

Patent Document 1 discloses a vehicle electric power steering apparatus including steered road wheels, a steering wheel, electric actuators each including three electric motors that operate in parallel for changing the steering angle of the steered road wheels, three control devices that operate in parallel, an interconnection bus that connects three electrical control channels to each other, and means for detecting whether any one of the states of the electrical control channels differs from the states of the other two electrical control channels, outputting, if there is such a difference, an error warning, and maintaining the operation in a downgraded mode. Each of the control devices constitutes part of its corresponding electrical control channel for the steering angle connected to a position sensor. The control device of the individual electrical channel receives one of the three electrical signals, drives an electric motor, and outputs a steering angle. In normal operation, the torques that are output by the individual motors are summed.

REFERENCE DOCUMENT LIST

Patent Document

Patent Document 1: JP 2007-210607 A

SUMMARY OF THE INVENTION

Problem to be Solved by the Invention

If a failure occurs in one of a plurality of control devices which drive and control a plurality of electric motors that operate in parallel, and if this malfunctioning control device stops supplying power to its corresponding electric motor, the total output of the electric motors becomes less than the total output generated when all the control devices are normal. As a result, the electric power steering apparatus may fail to exhibit its original performance.

The present invention has been made in view of actual circumstances, and an object of the present invention is to provide an electric power steering apparatus, an electric power steering apparatus control method, and a steering control device that can prevent reduction in total output of electric motors even when a failure occurs in one of a plurality of control devices.

Means for Solving the Problem

In one aspect, an electric power steering apparatus according to the present invention includes: a steering device that is capable of steering steered road wheels based on an output of a first actuator and an output of a second actuator; and a steering control device that is capable of controlling the steering device. The steering control device includes a first control device that is connected to the first actuator and that is capable of controlling the first actuator, a second control device that is connected to the second actuator and that is capable of controlling the second actuator, and a third control device that is capable of switching connection to and disconnection from at least one of the first actuator and the second actuator. When a failure of the first control device is detected, the first control device is disconnected from the first actuator, and the third control device is connected to the first actuator. When a failure of the second control device is detected, the second control device is disconnected from the second actuator, and the third control device is connected to the second actuator.

In one aspect, an electric power steering apparatus control method according to the present invention is an electric power steering apparatus control method for controlling an electric power steering apparatus including a steering device that is capable of steering steered road wheels based on an output of a first actuator and an output of a second actuator, a first control device that is connected to the first actuator and that is capable of controlling the first actuator, a second control device that is connected to the second actuator and that is capable of controlling the second actuator, and a third control device that is capable of switching connection to and disconnection from at least one of the first actuator and the second actuator. The electric power steering apparatus control method includes: when a failure occurs in the first control device, disconnecting the first control device from the first actuator, and connecting the third control device to the first actuator; and when a failure occurs in the second control device, disconnecting the second control device from the second actuator, and connecting the third control device to the second actuator.

In one aspect, a steering control device according to the present invention is a steering control device capable of controlling the first actuator and the second actuator installed in a steering device capable of steering steered road wheel. The steering control device includes: a first drive circuit that is connected to the first actuator; a first control device that is capable of controlling the first drive circuit; a second drive circuit that is connected to the second actuator; a second control device that is capable of controlling the second drive circuit; a third drive circuit that is connected to the first actuator and the second actuator; and a third control device that is capable of switching connection and disconnection among the first actuator, the second actuator, the first drive circuit, the second drive circuit, and the third drive circuit. When a failure occurs in the first control device, the third control device disconnects the first drive circuit from the first actuator, and connects the third drive circuit to the first actuator. When a failure occurs in the second control device, the third control device disconnects the second drive circuit from the second actuator, and connects the third drive circuit to the second actuator.

Effects of the Invention

The present invention can prevent reduction in total output of electric motors even when a failure occurs in one of a plurality of control devices.

MODE FOR CARRYING OUT THE INVENTION

Hereinafter, examples of an electric power steering apparatus, an electric power steering apparatus control method, and a steering control device according to the present invention will be described with reference to the drawings.

Figure 1:
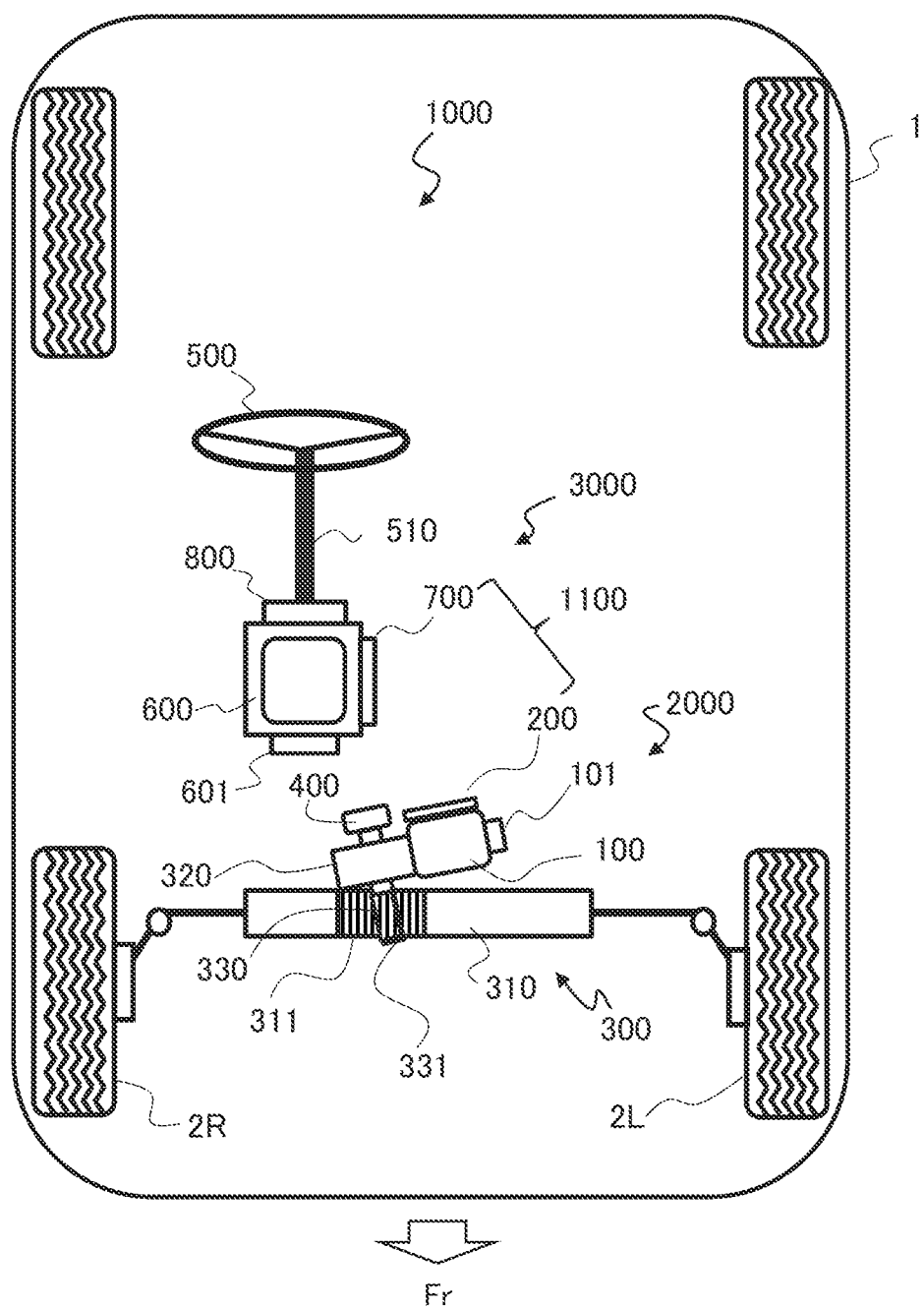
FIG. 1 is a system diagram of an electric power steering apparatus.

FIG. 1 is a configuration diagram illustrating a mode of an electric power steering apparatus 1000 of a vehicle 1, which is an automobile or the like. In FIG. 1, "Fr" denotes the front side of the vehicle.

Electric power steering apparatus 1000 includes a steering device 2000 and a reaction force generation device 3000.

Steering device 2000 is a device that is capable of steering front wheels 2L and 2R, which are the steered road wheels, through an operation of an electric motor 100, which is a turning actuator.

Reaction force generation device 3000 is a device that is capable of adding reaction force torque to steering wheel 500 through an operation of an electric motor 600, which is a reaction force actuator.

In FIG. 1, steering device 2000 and reaction force generation device 3000 are mechanically separate from each other, and electric power steering apparatus 1000 is a so-called steer-by-wire system.

In other words, electric power steering apparatus 1000 is a steer-by-wire system of vehicle 1 in which steering wheel 500 and front wheels 2L and 2R, which are the steered road wheels, are mechanically separate from each other.

Power steering apparatus 1000 can be configured as a steer-by-wire system in which, if an abnormality occurs, steering device 2000 and reaction force generation device 3000 can be mechanically coupled to each other, in other words, front wheels 2L and 2R and steering wheel 500 can be mechanically coupled to each other.

Steering device 2000 includes electric motor 100 that generates turning force applied to front wheels 2L and 2R, a steering control device 200 that drives and controls electric motor 100, a turning mechanism 300, and a turning angle detection device 400 that detects the turning angle of front wheels 2L and 2R (in other words, the position of turning mechanism 300).

Electric motor 100 is a brushless motor and has a motor rotation angle sensor 101 that detects the rotor position, in other words, the rotation angle of the output shaft of electric motor 100.

Turning mechanism 300 is a mechanism that converts the rotation motion of the output shaft of electric motor 100 into a linear motion of a steering rod 310. A rack and a pinion are used in this example.

The rotational driving force of electric motor 100 is transferred to a pinion shaft 330 via a decelerator 320.

Steering rod 310 has a rack 311 that engages with a pinion 331 formed on pinion shaft 330. When pinion 331 rotates, steering rod 310 horizontally moves in the right or left direction of vehicle 1, thereby changing the angle of front wheels 2L and 2R.

In other words, steering device 2000 includes rack 311 that is capable of steering front wheels 2L and 2R as rack 311 moves in the axial direction, and includes pinion shaft 330 that has teeth engaging with the teeth of rack 311 and that is rotated by electric motor 100.

Turning mechanism 300 may be formed, for example, by using a ball screw, in place of a rack and a pinion.

Reaction force generation device 3000 includes steering wheel 500 that is operated by the driver of vehicle 1, a steering shaft 510 that is coupled to steering wheel 500 and rotated with the rotation of steering wheel 500, electric motor 600 that generates steering reaction force, a reaction force control device 700 that drives and controls electric motor 600, and a steering angle detection device 800 that detects the steering angle, which is the operation angle of steering wheel 500.

In addition, steering control device 200 of steering device 2000 controls electric motor 100, which is a turning actuator, by comparing information about a target turning angle based on the steering angle of steering wheel 500 detected by steering angle detection device 800 with information about an actual turning angle detected by turning angle detection device 400.

Reaction force control device 700 of reaction force generation device 3000 calculates target reaction force torque, for example, based on information about the steering angle of steering wheel 500 and information about the speed of vehicle 1, and causes, based on this target reaction force torque, electric motor 600, which is a reaction force actuator, to generate steering reaction force.

Electric motor 600 is a brushless motor and has motor rotation angle sensor 601 that detects the rotor position, in other words, the rotation angle of the output shaft of electric motor 600.

Steering control device 200 and reaction force control device 700 constitute a control device 1100 that outputs signals used for controlling electric power steering apparatus 1000.

Figure 2:
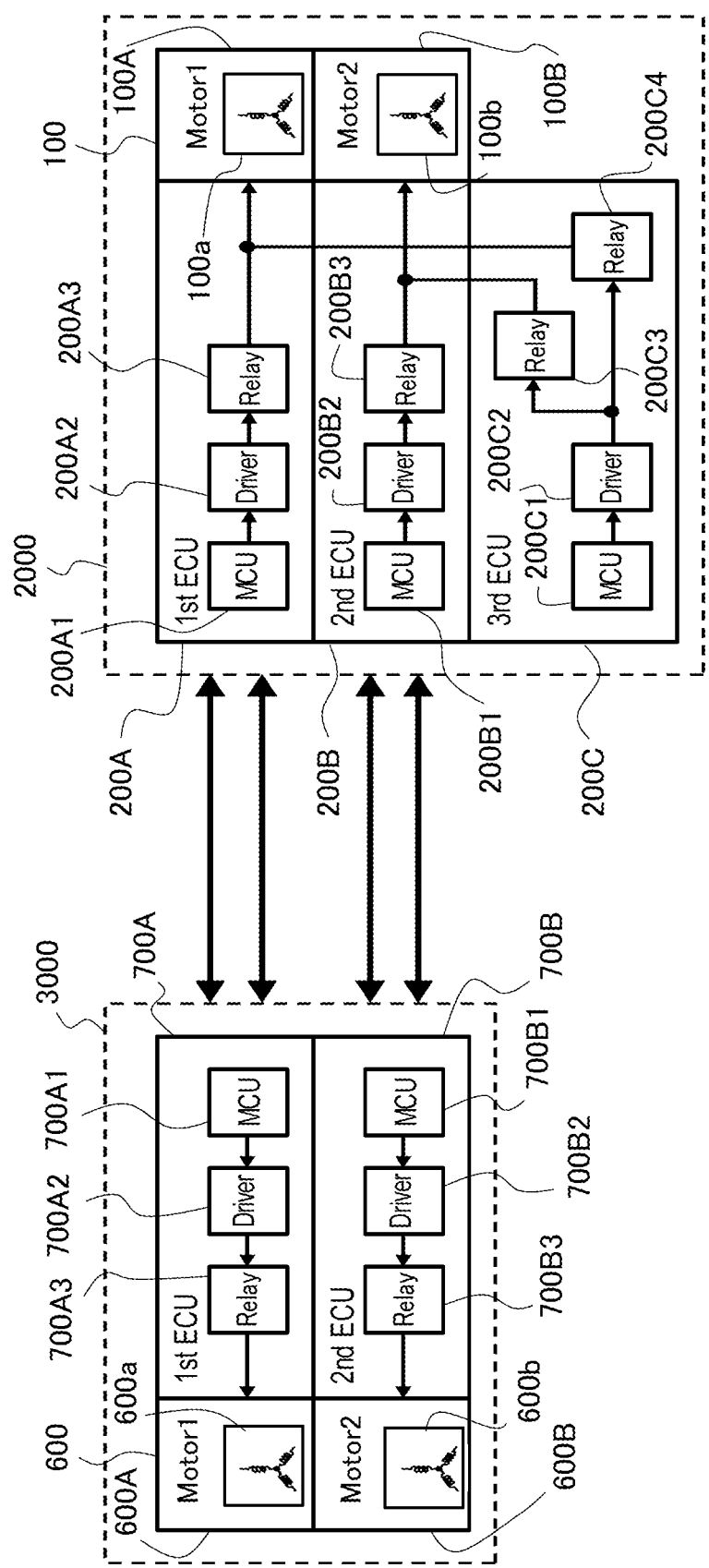
FIG. 2 is a block diagram schematically illustrating a steering control device and a reaction force control device.

FIG. 2 is a block diagram schematically illustrating a configuration of steering control device 200 and reaction force control device 700.

Steering device 2000 is a device that is capable of steering front wheels 2L and 2R based on the output of electric motor 100, which is a turning actuator.

Electric motor 100 is a three-phase brushless motor, and has a first winding set 100a and a second winding set 100b, each of which is a winding set formed by a U-phase coil, a V-phase coil, and a W-phase coil.

In other words, electric motor 100 has a first electric motor 100A (a first actuator) having first winding set 100a, which is a stator with three-phase windings, and has a second electric motor 100B (a second actuator) having second winding set 100b, which is a stator with three-phase windings.

Steering device 2000 steers front wheels 2L and 2R by operating first electric motor 100A and second electric motor 100B in parallel.

Steering control device 200 includes a first control device 200A that is connected to first winding set 100a and that is capable of controlling a current supplied to first winding set 100a, a second control device 200B that is connected to second winding set 100b and that is capable of controlling a current supplied to second winding set 100b, and a third control device 200C that is capable of switching connection to, and disconnection from, first winding set 100a and that is capable of switching connection to, and disconnection from, second winding set 100b.

First control device 200A is an electronic control unit (ECU) including a first microcontroller unit (MCU) 200A1, a first drive circuit 200A2, and a first relay 200A3.

Second control device 200B is an ECU including a second MCU 200B1, a second drive circuit 200B2, and a second relay 200B3.

Third control device 200C is an ECU including a third MCU 200C1, a third drive circuit 200C2, a third relay 200C3, and a fourth relay 200C4.

In this example, at least MCUs 200A1 and 200B1 among MCUs 200A1, 200B1, and 200C1 may each be configured as a multi-core MCU including a plurality of processor cores.

For example, if a dual-core MCU is adopted as the multi-core MCU, when an abnormality occurs in a first processor core (in other words, the main system) of the dual-core MCU, a second processor core (in other words, the backup system) may continue to drive and control its corresponding electric motor, which is an actuator, and may monitor its corresponding pre-driver, inverter, and power supply.

The term "MCU" may be referred to as a "microcomputer", "processor", "processing device", "arithmetic device", or the like.

MCUs 200A1, 200B1, and 200C1 output a control signal (in other words, a command signal) for controlling the power supplied to first electric motor 100A or second electric motor 100B to their respective drive circuits 200A2, 200B2, and 200C2.

Drive circuits 200A2, 200B2, and 200C2 include a pre-driver, an inverter, etc., and supply a current to first winding set 100a or second winding set 100b.

Turning on and off of first relay 200A3 is controlled by first MCU 200A1 of first control device 200A, whereby connection and disconnection between first drive circuit 200A2 and first winding set 100a are switched.

Turning on and off of second relay 200B3 is controlled by second MCU 200B1 of second control device 200B, whereby connection and disconnection between second drive circuit 200B2 and second winding set 100b are switched.

Turning on and off of third relay 200C3 is controlled by third MCU 200C1, whereby connection and disconnection between third drive circuit 200C2 and first winding set 100a are switched.

Turning on and off of fourth relay 200C4 is controlled by third MCU 200C1, whereby connection and disconnection between third drive circuit 200C2 and second winding set 100b are switched.

First relay 200A3 may be configured such that first relay 200A3 can be set to off (a disconnected state) by third MCU 200C1 of third control device 200C. First relay 200A3 may be configured such that first relay 200A3 can be set to off, that is, a disconnected state, when at least one of first MCU 200A1 of first control device 200A and third MCU 200C1 of third control device 200C outputs an off command.

Similarly, second relay 200B3 may be configured such that second relay 200B3 can be set to off (a disconnected state) by second MCU 200B1 of second control device 200B. Second relay 200B3 may be configured such that second relay 200B3 can be set to off, that is, a disconnected state, when at least one of second MCU 200B1 of second control device 200B and third MCU 200C1 of third control device 200C outputs an off command.

Control devices 200A, 200B, and 200C monitor presence or absence of a failure in their respective drive circuits 200A2, 200B2, and 200C2.

If a failure occurs in first drive circuit 200A2 of first control device 200A, first relay 200A3 is set to off, and first drive circuit 200A2 and first winding set 100a are consequently disconnected from each other. Instead, third relay 200C3 is set to on, and third drive circuit 200C2 and first winding set 100a are consequently connected to each other.

That is, if a failure occurs in first control device 200A that drives and controls first winding set 100a, third control device 200C controls the current supplied to first winding set 100a, in place of first control device 200A.

If a failure occurs in second drive circuit 200B2 of second control device 200B, second relay 200B3 is set to off, and second drive circuit 200B2 and second winding set 100b are consequently disconnected from each other. Instead, fourth relay 200C4 is set to on, and third drive circuit 200C2 and second winding set 100b are consequently connected to each other.

That is, if a failure occurs in second control device 200B that drives and controls second winding set 100b, third control device 200C controls the current supplied to second winding set 100b, in place of second control device 200B.

If a failure occurs in third drive circuit 200C2 of third control device 200C, the state in which first drive circuit 200A2 and first winding set 100a are connected to each other and second drive circuit 200B2 and second winding set 100b are connected to each other is maintained.

Thus, even if a failure occurs in any one of first control device 200A, second control device 200B, and third control device 200C, steering device 2000 can drive and control first electric motor 100A and second electric motor 100B, and can continuously steer front wheels 2L and 2R without deterioration in performance.

In addition, even if a failure occurs in the first control device 200A and second control device 200B, steering device 2000 can continuously steer front wheels 2L and 2R by causing third control device 200C to drive and control first electric motor 100A and second electric motor 100B.

Reaction force generation device 3000 is a device that is capable of adding reaction force torque to steering wheel 500 based on the output of electric motor 600, which is a reaction force actuator.

Electric motor 600 is a three-phase brushless motor and has a first winding set 600a and a second winding set 600b, each of which is a winding set formed by a U-phase coil, a V-phase coil, and a W-phase coil.

In other words, electric motor 600 has a first electric motor 600A (a first actuator) having first winding set 600a, which is a stator with three-phase windings, and has a second electric motor 600B (a second actuator) having second winding set 600b, which is a stator with three-phase windings.

Reaction force generation device 3000 adds reaction force torque to steering wheel 500 by operating first electric motor 600A and second electric motor 600B in parallel.

Reaction force control device 700 includes a first control device 700A that is connected to first winding set 600a and that is capable of controlling a current supplied to first winding set 600a, and includes a second control device 700B that is connected to second winding set 600b and that is capable of controlling a current supplied to second winding set 600b.

First control device 700A includes a first MCU 700A1, a first drive circuit 700A2, and a first relay 700A3.

Second control device 700B includes a second MCU 700B1, a second drive circuit 700B2, and a second relay 700B3.

MCUs 700A1 and 700B1 output a control signal (a command signal) for controlling the power supplied to first electric motor 600A and second electric motor 600B to drive circuits 700A2 and 700B2, respectively.

Drive circuits 700A2 and 700B2 include a pre-driver, an inverter, etc., and supply the power to first electric motor 600A and second electric motor 600B, respectively.

Turning on and off of first relay 700A3 is controlled by first MCU 700A1, whereby connection and disconnection between first drive circuit 700A2 and first winding set 600a are switched.

Turning on and off of second relay 700B3 is controlled by second MCU 700B1, whereby connection and disconnection between second drive circuit 700B2 and second winding set 600b are switched.

As with steering control device 200, reaction force control device 700 may include a third control device in addition to first control device 700A and second control device 700B. In this case, the third control device may be configured to control the current supplied to first winding set 600a if a failure occurs in first control device 700A, and may be configured to control the current supplied to second winding set 600b if a failure occurs in second control device 700B.

Figure 3:
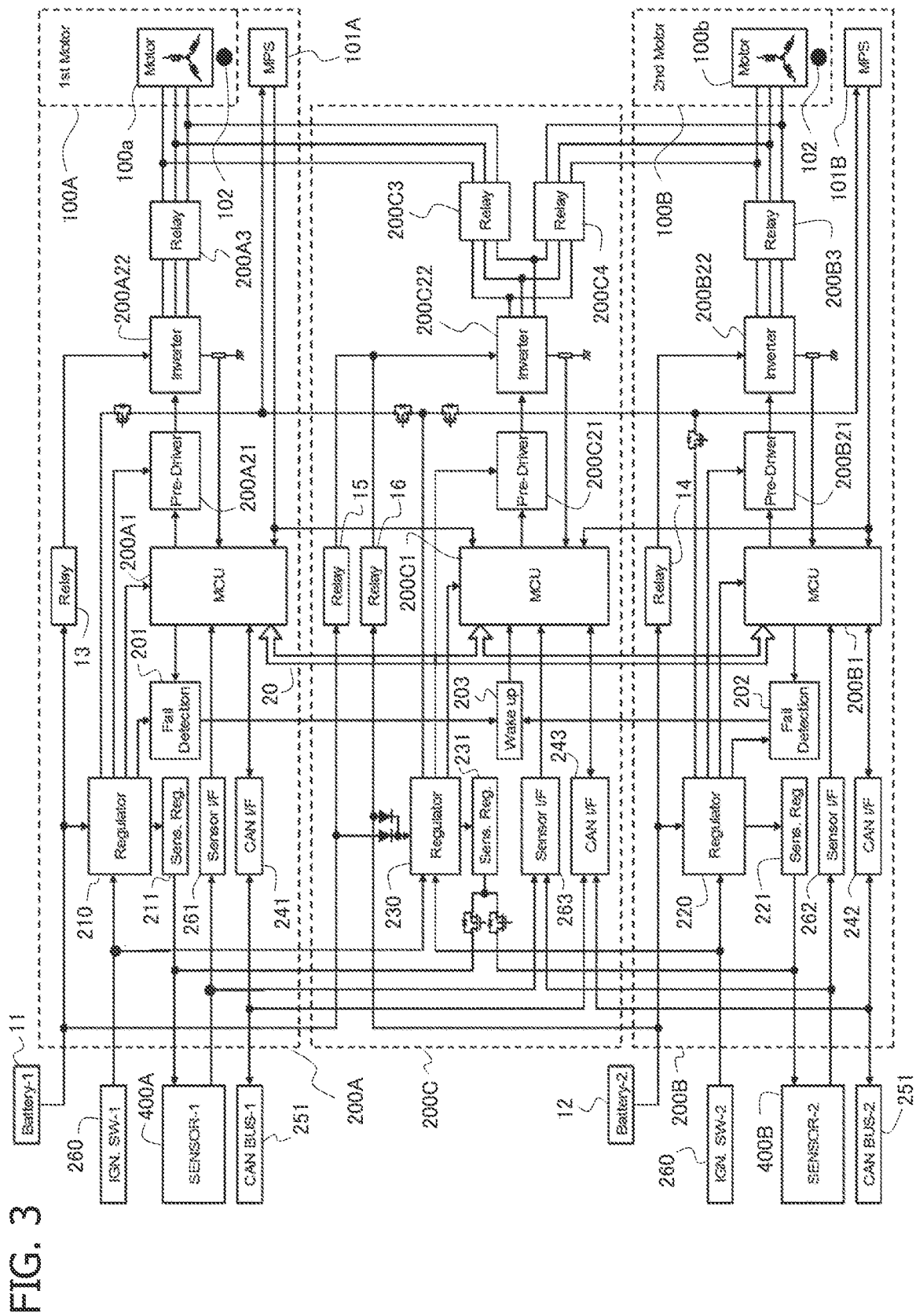
FIG. 3 is a block diagram illustrating a detailed configuration of the steering control device.

FIG. 3 is a block diagram illustrating a mode of a detailed configuration of steering control device 200.

The elements in FIG. 3 that are the same as those in FIG. 2 are denoted by the same reference characters.

First drive circuit 200A2 of first control device 200A includes a first pre-driver 200A21 and a first inverter 200A22.

Second drive circuit 200B2 of second control device 200B includes a second pre-driver 200B21 and a second inverter 200B22.

Third drive circuit 200C2 of third control device 200C includes a third pre-driver 200C21 and a third inverter 200C22.

Electric motor 100 includes a first motor rotation angle sensor 101A and a second motor rotation angle sensor 101B, each of which is for detecting the rotation angle of the output shaft.

For example, first motor rotation angle sensor 101A and second motor rotation angle sensor 101B are each a magnetic angle sensor that converts change in magnetic field of a magnet 102 formed at the output shaft of electric motor 100 into electrical resistance.

First MCU 200A1 and third MCU 200C1 acquire an output signal of first motor rotation angle sensor 101A, and second MCU 200B1 and third MCU 200C1 acquire an output signal of second motor rotation angle sensor 101B.

Vehicle 1 includes a first battery 11, which is a first power supply, and includes a second battery 12, which is a second power supply.

First inverter 200A22 receives power from first battery 11 via a relay 13.

Second inverter 200B22 receives power from second battery 12 via a relay 14.

Third inverter 200C22 receives power from first battery 11 via a relay 15 and receives power from second battery 12 via a relay 16.

MCUs 200A1, 200B1, and 200C1 are connected to each other via a communication line so that MCUs 200A1, 200B1, and 200C1 can communicate with one another.

In addition, first control device 200A includes a diagnosis circuit 201 that monitors first MCU 200A1, and second control device 200B includes a diagnosis circuit 202 that monitors second MCU 200B1.

A wake-up circuit 203 acquires a signal indicating a diagnosis result about first MCU 200A1 from diagnosis circuit 201, and acquires a signal indicating a diagnosis result about second MCU 200B1 from diagnosis circuit 202.

Upon detecting first MCU 200A1 or second MCU 200B1, wake-up circuit 203 outputs a wake-up signal to third MCU 200C1, so as to start third MCU 200C1.

In addition, first control device 200A includes a main voltage regulator 210 and a sensor voltage regulator 211.

Main voltage regulator 210 converts the voltage of first battery 11 into the operating voltage of first MCU 200A1, etc., and supplies the operating voltage to first MCU 200A1, first pre-driver 200A21, and diagnosis circuit 201, for example.

Sensor voltage regulator 211 converts the output voltage of main voltage regulator 210 into the operating voltage of a first turning angle sensor 400A constituting turning angle detection device 400, and outputs the operating voltage to first turning angle sensor 400A.

Turning angle detection device 400 has a redundant configuration including first turning angle sensor 400A and a second turning angle sensor 400B.

Second control device 200B includes a main voltage regulator 220 and a sensor voltage regulator 221.

Main voltage regulator 220 converts the voltage of second battery 12 into the operating voltage of second MCU 200B1, etc., and supplies the operating voltage to second MCU 200B1, second pre-driver 200B21, and diagnosis circuit 202, for example.

Sensor voltage regulator 221 converts the output voltage of main voltage regulator 220 into the operating voltage of second turning angle sensor 400B constituting turning angle detection device 400, and outputs the operating voltage to second turning angle sensor 400B.

Third control device 200C includes a main voltage regulator 230 and a sensor voltage regulator 231.

Main voltage regulator 230 converts the voltage of first battery 11 or second battery 12 into the operating voltage of third MCU 200C1, etc., and supplies the operating voltage to third MCU 200C1 and third pre-driver 200C21, for example.

Sensor voltage regulator 231 converts the output voltage of main voltage regulator 230 into the operating voltage of first turning angle sensor 400A and second turning angle sensor 400B constituting the turning angle detection device 400, and outputs the operating voltage to first turning angle sensor 400A or second turning angle sensor 400B.

That is, first turning angle sensor 400A is configured to operate by using the output voltage of sensor voltage regulator 211 or sensor voltage regulator 231 as its power supply voltage, and second turning angle sensor 400B is configured to operate by using the output voltage of sensor voltage regulator 221 or sensor voltage regulator 231 as its power supply voltage.

In addition, first motor rotation angle sensor 101A is configured to operate by using the output voltage of main voltage regulator 210 or main voltage regulator 230 as its power supply voltage. Second motor rotation angle sensor 101B is configured to operate by using the output voltage of main voltage regulator 220 or main voltage regulator 230 as its power supply voltage.

First MCU 200A1 acquires the output signal of first turning angle sensor 400A via a sensor interface 261.

Second MCU 200B1 acquires the output signal of second turning angle sensor 400B via a sensor interface 262.

Third MCU 200C1 acquires the output signal of first turning angle sensor 400A and the output signal of second turning angle sensor 400B via a sensor interface 263.

First MCU 200A1 is connected to a CAN bus 251 constituting an on-board network via a CAN interface 241.

Second MCU 200B1 is connected to CAN bus 251 via a CAN interface 242.

Third MCU 200C1 is connected to CAN bus 251 via a CAN interface 243.

First MCU 200A1, second MCU 200B1, and third MCU 200C1 communicate with other MCUs connected to CAN bus 251.

Main voltage regulator 210, main voltage regulator 220, and main voltage regulator 230 operate based on a signal from an ignition switch (IGN SW) 260.

Next, a process performed when a failure occurs in any one of MCUs 200A1, 200B1, and 200C1 of steering control device 200 will be described.

Figure 4:
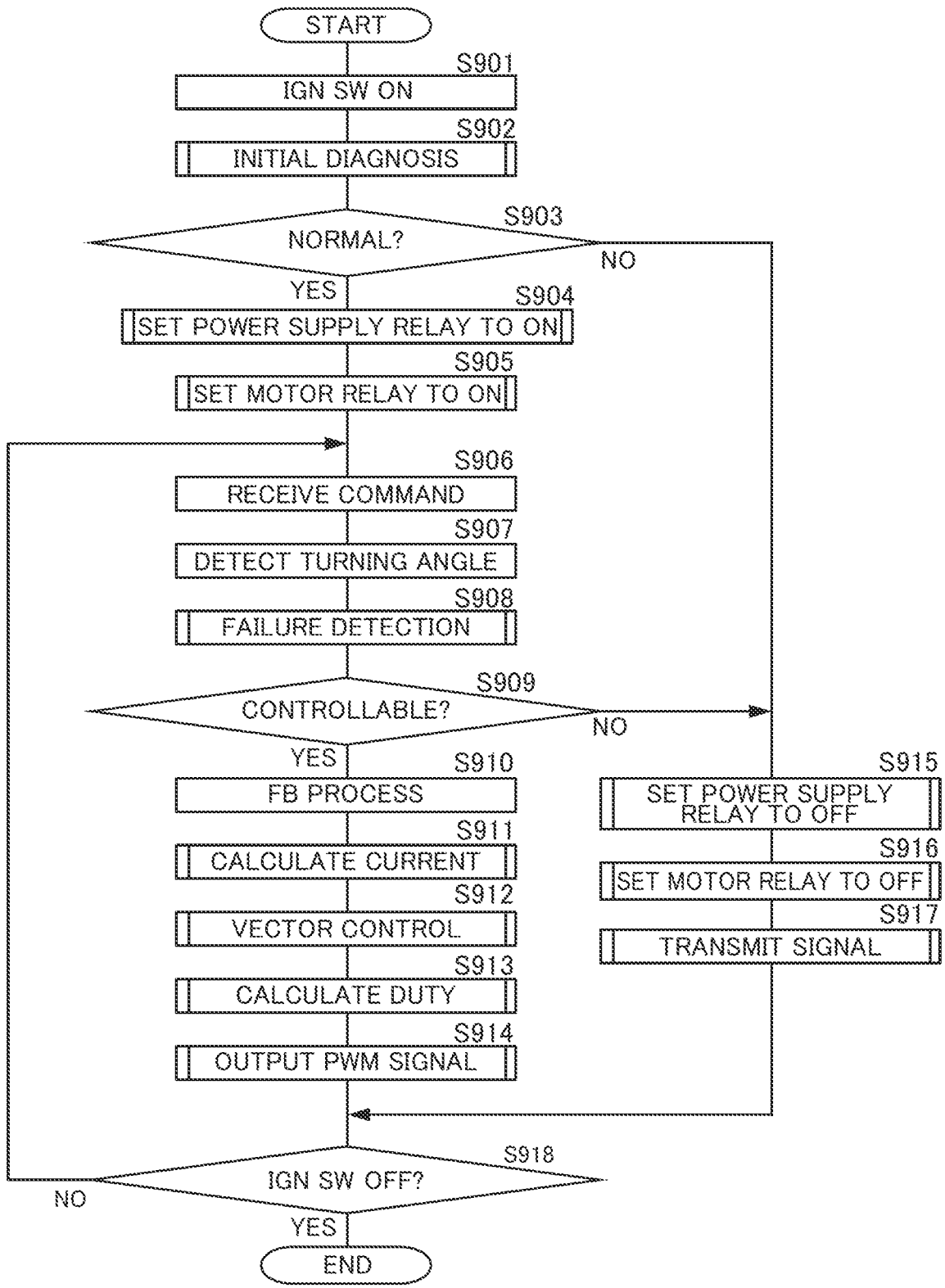
FIG. 4 is a flowchart illustrating a process performed by a first control device and a second control device.

FIG. 4 is a flowchart illustrating a process performed by first control device 200A (first MCU 200A1) and second control device 200B (second MCU 200B1).

Although the flowchart in FIG. 4 illustrates a process performed by first control device 200A and second control device 200B in parallel, the following description will be made on the process performed by first control device 200A.

In step S901, first control device 200A (first MCU 200A1) is started by turning on of ignition switch 260. Next, in step S902, first control device 200A performs initial diagnosis (self-diagnosis).

In step S902, first control device 200A monitors a failure of first pre-driver 200A21, a failure of first inverter 200A22, and a failure of first battery 11 that supplies power to first pre-driver 200A21 and first inverter 200A22.

By monitoring the output of first pre-driver 200A21 and the output of first inverter 200A22, first control device 200A monitors presence or absence of a failure in first pre-driver 200A21 and a failure in first inverter 200A22. In addition, by monitoring the voltage of first battery 11, first control device 200A monitors presence or absence of a failure in first battery 11.

By performing this diagnosis process, first control device 200A can detect a failure mode in which first inverter 200A22 cannot be controlled.

In step S903, first control device 200A determines whether the result of the initial diagnosis indicates normal or abnormal.

If the result of the initial diagnosis indicates normal, the process proceeds to step S904, and first control device 200A sets relay 13 (in other words, a power supply relay) that switches on/off of the power supply to first inverter 200A22 to on. Next, in step S905, first control device 200A sets relay 200A3 (in other words, a motor relay) that switches connection and disconnection between first inverter 200A22 and first winding set 100a to on.

That is, if the result of the initial diagnosis indicates normal, first control device 200A supplies power to first inverter 200A22, and connects first inverter 200A22 and first winding set 100a. As a result, first control device 200A becomes able to control the current supplied to first winding set 100a.

Next, in step S906, first control device 200A acquires a command about the turning angle of front wheels 2L and 2R, that is, a signal indicating the target turning angle, from reaction force control device 700.

Next, in step S907, first control device 200A acquires information about a detected value of the turning angle, that is, a signal indicating the actual turning angle, from turning angle detection device 400.

Next, in step S908, first control device 200A performs self-diagnosis on presence or absence of a failure, as in step S902.

In step S908, first control device 200A monitors presence or absence of a failure in first pre-driver 200A21, a failure in first inverter 200A22, and a failure in first battery 11 that supplies power to first pre-driver 200A21 and first inverter 200A22, as in step S902.

Next, in step S909, first control device 200A determines whether the result of the self-diagnosis in step S908 indicates a normal state, in other words, whether the current supplied to first winding set 100a is controllable.

If the result of the self-diagnosis indicates normal, the process proceeds to step S910, and first control device 200A performs the current control on first winding set 100a.

In step S910, first control device 200A compares the target turning angle, which is a command about the turning angle of front wheels 2L and 2R, with the actual turning angle detected by turning angle detection device 400, so as to calculate control deviation.

Next, in step S911, first control device 200A calculates a motor current based on the control deviation. In step S912, first control device 200A performs vector control in which the current component that generates torque and the current component that generates a magnetic flux at the rotor are separately controlled.

Next, in step S913, first control device 200A calculates the duty ratio in pulse width modulation (PWM) control on a switching element of first inverter 200A22. In step S914, a duty command is output to first pre-driver 200A21 as a drive signal.

Next, the process proceeds to step S918, and first control device 200A determines whether ignition switch 260 has been switched from on to off.

If ignition switch 260 is maintained in the on-state, the process returns to step S906, and first control device 200A repeats the subsequent steps from step S906.

If ignition switch 260 has been switched from on to off, first control device 200A ends the process.

In addition, if first control device 200A determines an abnormality in the self-diagnosis in step S903 or step S909, the process proceeds to step S915.

That is, if an abnormality occurs in any one of first pre-driver 200A21, first inverter 200A22, and first battery 11, the process proceeds to step S915, and first control device 200A stops the current control on first winding set 100a.

In step S915, first control device 200A sets relay 13, which is the power supply relay for switching connection and disconnection between first battery 11 and first inverter 200A22 to off, so as to disconnect first battery 11 and first inverter 200A22.

Next, in step S916, first control device 200A sets first relay 200A3, which is the motor relay for switching connection and disconnection between first drive circuit 200A2 and first winding set 100a to off, so as to disconnect first drive circuit 200A2 and first winding set 100a.

Next, in step S917, first control device 200A transmits a signal indicating that an abnormality has been detected in the self-diagnosis to third control device 200C (specifically, third MCU 200C1).

That is, in an abnormal state in which the current control on first winding set 100a cannot be normally performed, first control device 200A sets relay 13 and first relay 200A3 to off, stops the current control on first winding set 100a, notifies third control device 200C of the occurrence of the abnormality, and causes third control device 200C to begin the current control on first winding set 100a as will be described below.

First control device 200A may add information about presence or absence of a failure and information about the location of the failure, e.g., information about which one of first pre-driver 200A21, first inverter 200A22, and first battery 11 has a failure, in the failure information to be transmitted to third control device 200C.

As described above, relay 13 and first relay 200A3 may be configured to be set to off when at least one of first MCU 200A1 of first control device 200A and third MCU 200C1 of third control device 200C outputs an off command.

Third MCU 200C1 of third control device 200C may output a command signal for setting relay 13 and first relay 200A3 to off when acquiring a signal indicating an abnormality in first control device 200A.

Figure 5:
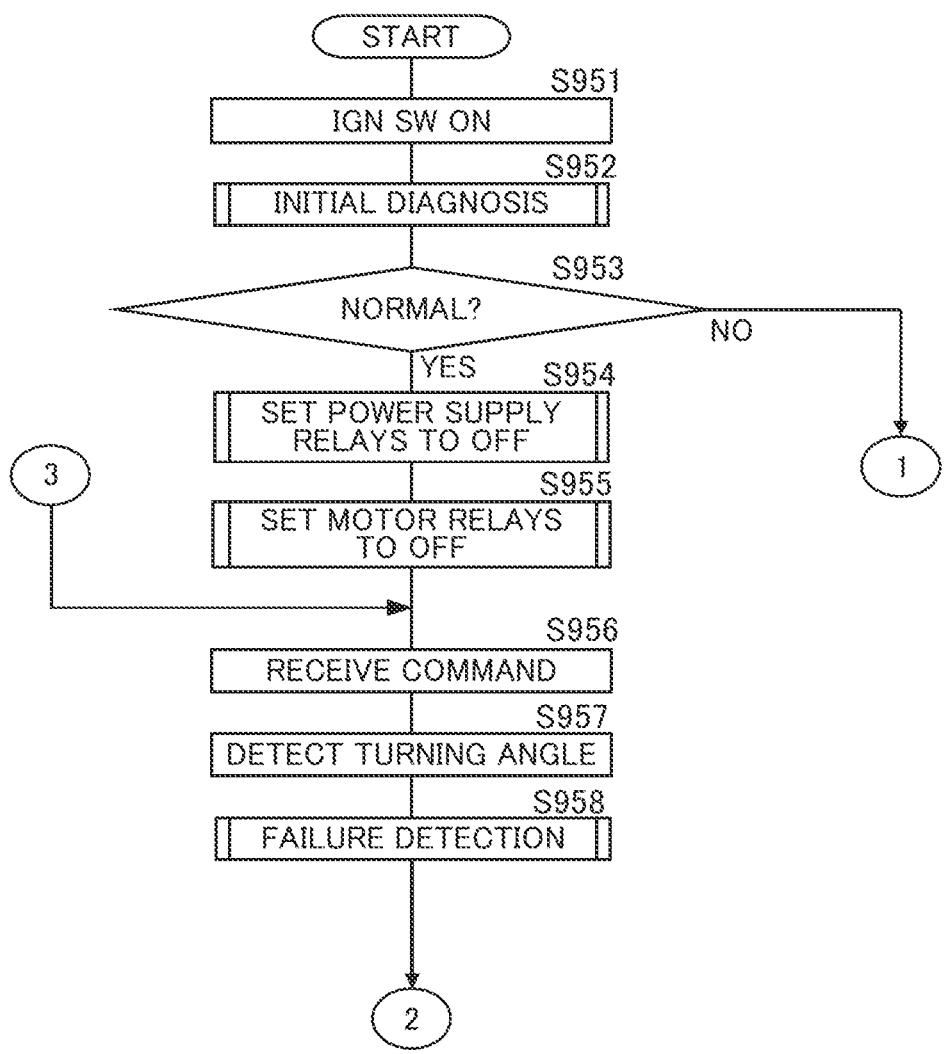
FIG. 5 is a flowchart illustrating the first half of a process performed by a third control device.
Figure 6:
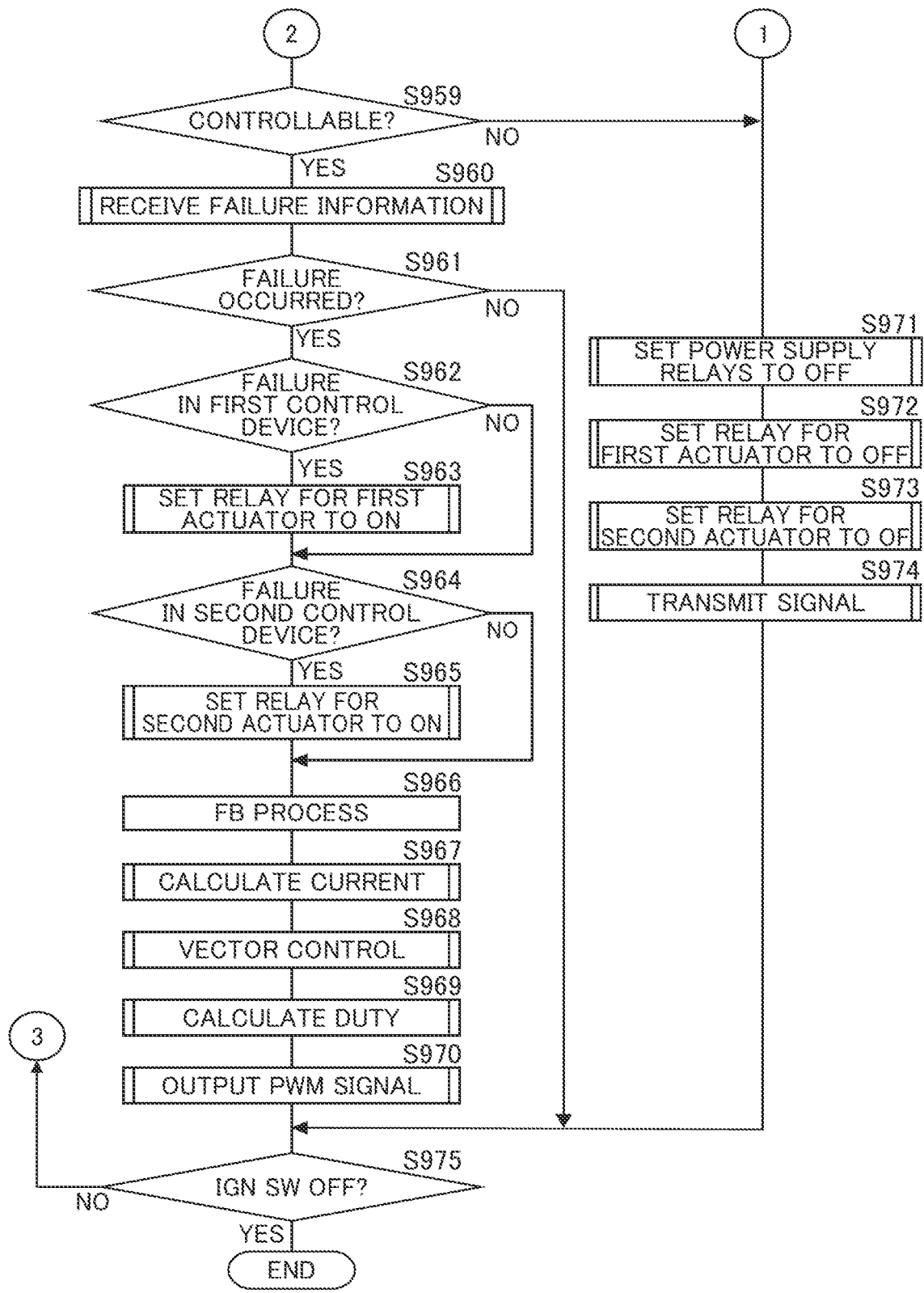
FIG. 6 is a flowchart illustrating the second half of the process performed by the third control device.

FIGS. 5 and 6 illustrate a flowchart illustrating a process performed by third control device 200C (specifically, third MCU 200C1).

In step S951, third control device 200C is started by turning on of ignition switch 260. Next, in step S952, third control device 200C performs initial diagnosis (in other words, self-diagnosis).

In step S952, third control device 200C monitors presence or absence of a failure in third pre-driver 200C21, a failure in third inverter 200C22, a failure in first battery 11, and a failure in second battery 12. Each of these batteries supplies power to third pre-driver 200C21 and third inverter 200C22.

That is, when ignition switch 260 is set to on, that is, when the power supply of vehicle 1 in which electric power steering apparatus 1000 is mounted is set to on, third control device 200C detects a failure mode in which electric motor 100, that is, first winding set 100a and second winding set 100b, cannot be controlled, by monitoring presence or absence of a failure in third pre-driver 200C21, a failure in third inverter 200C22, and a failure in the power supplies.

By performing the initial diagnosis, third control device 200C can detect whether third control device 200C is in a normal state in which third control device 200C can perform the motor control performed by first control device 200A or second control device 200B. In this way, the safety achieved when a failure occurs in first control device 200A or second control device 200B can be improved.

In addition, by causing third control device 200C to perform the self-diagnosis when ignition switch 260 is set to on, whether a failure has occurred in third control device 200C can be determined before vehicle 1 runs, whereby better safety can be achieved.

When ignition switch 260 is set to off, that is, when the power supply of vehicle 1 in which electric power steering apparatus 1000 is mounted is set to off (in other words, the time between off of ignition switch 260 and self-shut-off), third control device 200C may monitor a failure in third pre-driver 200C21, a failure in third inverter 200C22, and a failure in the power supplies.

By causing third control device 200C to perform the self-diagnosis when ignition switch 260 is set to off, it is possible to prevent the self-diagnosis performed by third control device 200C from affecting the motor control performed by first control device 200A and second control device 200B.

In step S953, third control device 200C determines whether the result of the initial diagnosis indicates normal or abnormal.

If the result of the initial diagnosis indicates normal, the process proceeds to step S954, and third control device 200C sets relays 15 and 16, which are the power supply relays for switching on/off of the supply of the power to third inverter 200C22, to off.

Next, in step S955, third control device 200C sets third relay 200C3 for switching connection and disconnection between third inverter 200C22 and first winding set 100a to off, and sets fourth relay 200C4 for switching connection and disconnection between third inverter 200C22 and second winding set 100b to off.

That is, third control device 200C performs the motor control when first control device 200A or second control device 200B enters an abnormal state. Thus, third control device 200C normally maintains relay 15, relay 16, third relay 200C3, and fourth relay 200C4 in an off-state, and stands by without performing the motor control (in other words, without outputting a motor current).

Next, in step S956, third control device 200C acquires a command about the turning angle of front wheels 2L and 2R, that is, a signal indicating the target turning angle, from reaction force control device 700.

Next, in step S957, third control device 200C acquires information about a detected value of the turning angle, that is, a signal about the actual turning angle, from turning angle detection device 400.

Next, in step S958, third control device 200C performs self-diagnosis to determine presence or absence of a failure, as in step S952.

Next, in step S959, third control device 200C determines whether the result of the self-diagnosis in step S958 indicates a normal state, in other words, whether the current control on first winding set 100a or second winding set 100b is possible.

If the result of the self-diagnosis in step S958 indicates normal, the process proceeds from step S959 to step S960, and third control device 200C performs the motor control performed when first control device 200A or second control device 200B enters an abnormal state.

In step S960, third control device 200C monitors presence or absence of a failure in first control device 200A and a failure in second control device 200B by acquiring information about a failure in first control device 200A and a failure in second control device 200B, that is, a signal indicating the result of the self-diagnosis, through communication with first control device 200A and second control device 200B.

Next, in step S961, third control device 200C determines whether a failure has occurred in first control device 200A or second control device 200B, based on the failure information acquired in step S960.

Third control device 200C can perform the failure diagnosis that monitors presence or absence of a failure in first control device 200A and a failure in second control device 200B, for example, by detecting the output voltage of first inverter 200A22 and the output voltage of second inverter 200B22.

Third control device 200C can accurately determine occurrence of a failure in first control device 200A and occurrence of a failure in second control device 200B by performing the failure diagnosis on first control device 200A and second control device 200B.

In addition, third control device 200C can accurately detect a failure in first control device 200A and second control device 200B by detecting the output voltage of first inverter 200A22 and the output voltage of second inverter 200B22.

Third MCU 200C1 of third control device 200C may determine presence or absence of a failure in first control device 200A by determining whether third MCU 200C1 can perform a normal communication with first MCU 200A1 of first control device 200A. Similarly, third MCU 200C1 of third control device 200C may determine presence or absence of a failure in second control device 200B by determining whether third MCU 200C1 can perform a normal communication with second MCU 200B1 of second control device 200B.

In this case, if first control device 200A and second control device 200B are in a normal state and can perform the motor control, the process directly proceeds to step S975 by skipping steps S962 to S970.

In step S975, third control device 200C determines whether ignition switch 260 has been switched from on to off.

If ignition switch 260 is maintained in the on-state, the process returns to step S956, and third control device 200C repeats the subsequent steps from step S956.

If ignition switch 260 has been switched from on to off, third control device 200C ends the process.

If first control device 200A or second control device 200B is in a failure state and cannot perform the motor control, in other words, if third control device 200C detects a failure in first control device 200A or second control device 200B, the process proceeds to step S962.

In step S962, third control device 200C determines whether a failure has occurred in first control device 200A. If third control device 200C detects a failure in first control device 200A, the process proceeds to step S963. If first control device 200A is normal, the process proceeds to step S964 by skipping step S963.

In step S963, third control device 200C sets third relay 200C3 to on and sets one of relay 15 and relay 16 to on, whereby the current control on first winding set 100a is made possible.

That is, by setting third relay 200C3 to on in step S963, third control device 200C connects to first winding set 100a. In addition, by supplying power to third inverter 200C22, third control device 200C becomes able to perform the current control on first winding set 100a.

If first relay 200A3 is configured to be set to off based on an off command from at least one of first control device 200A and third control device 200C, third control device 200C can output a signal for setting first relay 200A3 to off in step S963.

By causing third control device 200C to set first relay 200A3 to off when a failure in first control device 200A is detected, first control device 200A and first winding set 100a are reliably disconnected from each other, and the state in which first control device 200A controls first winding set 100a is smoothly shifted to the state in which third control device 200C controls first winding set 100a.

For example, if both first battery 11 and second battery 12 are normal, third control device 200C sets relay 15 to on in step S963. If a failure (for example, a voltage drop) occurs in first battery 11, third control device 200C sets relay 16 to on.

That is, even if a failure occurs in either of first battery 11 and second battery 12, third control device 200C can perform the current control on first winding set 100a by using a normal battery.

In this way, steering control device 200 can maintain its performance even if a failure occurs in a battery, which is a power supply.

In step S964, third control device 200C determines whether a failure has occurred in second control device 200B. If a failure has occurred in second control device 200B, the process proceeds to step S965. If second control device 200B is normal, the process proceeds to step S966 by skipping step S965.

In step S965, third control device 200C sets fourth relay 200C4 to on and sets one of relay 15 and relay 16 to on, whereby the current control on second winding set 100b is made possible.

Since third control device 200C performs step S965 in the same way as step S963 performed when a failure has occurred in first control device 200A, detailed description thereof will be omitted.

If a failure has occurred in first control device 200A and second control device 200B, third control device 200C sets third relay 200C3 and fourth relay 200C4 to on, and controls the current to first winding set 100a and the current to second winding set 100b.

When controlling the current to first winding set 100a and second winding set 100b, third control device 200C outputs a greater motor current value than that output when third control device 200C controls the current to one of first winding set 100a and second winding set 100b.

In this way, it is possible to prevent the output of electric motor 100 from decreasing when a failure occurs in first control device 200A and second control device 200B.

Third control device 200C may be configured to be connected to either of first winding set 100a and second winding set 100b when a failure occurs in first control device 200A and second control device 200B.

However, by connecting third control device 200C to first winding set 100a and second winding set 100b and supplying a current to both first winding set 100a and second winding set 100b when a failure occurs in first control device 200A and second control device 200B, electric motor 100 can be driven smoothly.

In steps S966 to S970, as in steps S910 to 914, third control device 200C controls the current to first winding set 100a or second winding set 100b based on pulse width modulation (PWM).

In step S959, if third control device 200C determines that third control device 200C is in a failure state and cannot control electric motor 100, the process proceeds to step S971.

In step S971, third control device 200C sets relays 15 and 16, which are power supply relays, to off. Next, in step S972, third control device 200C sets third relay 200C3 to off. Next, in step S973, third control device 200C sets fourth relay 200C4 to off.

That is, for example, when a failure occurs in third drive circuit 200C2 of third control device 200C, third control device 200C sets all of relays 15, 16, 200C3, and 200C4 to off, stops supplying the power to third inverter 200C22, and stops the output of third inverter 200C22.

Next, in step S974, third control device 200C transmits a signal indicating that an abnormality has been detected in the self-diagnosis to first control device 200A and second control device 200B.

If a failure occurs in third control device 200C and if first control device 200A and second control device 200B are normal, first control device 200A controls the current to first winding set 100a, and second control device 200B controls the current to second winding set 100b.

If a failure occurs in third control device 200C and if a failure occurs in first control device 200A, second control device 200B continues the current control on second winding set 100b, so as to continue the turning operation on front wheels 2L and 2R.

Figure 7:
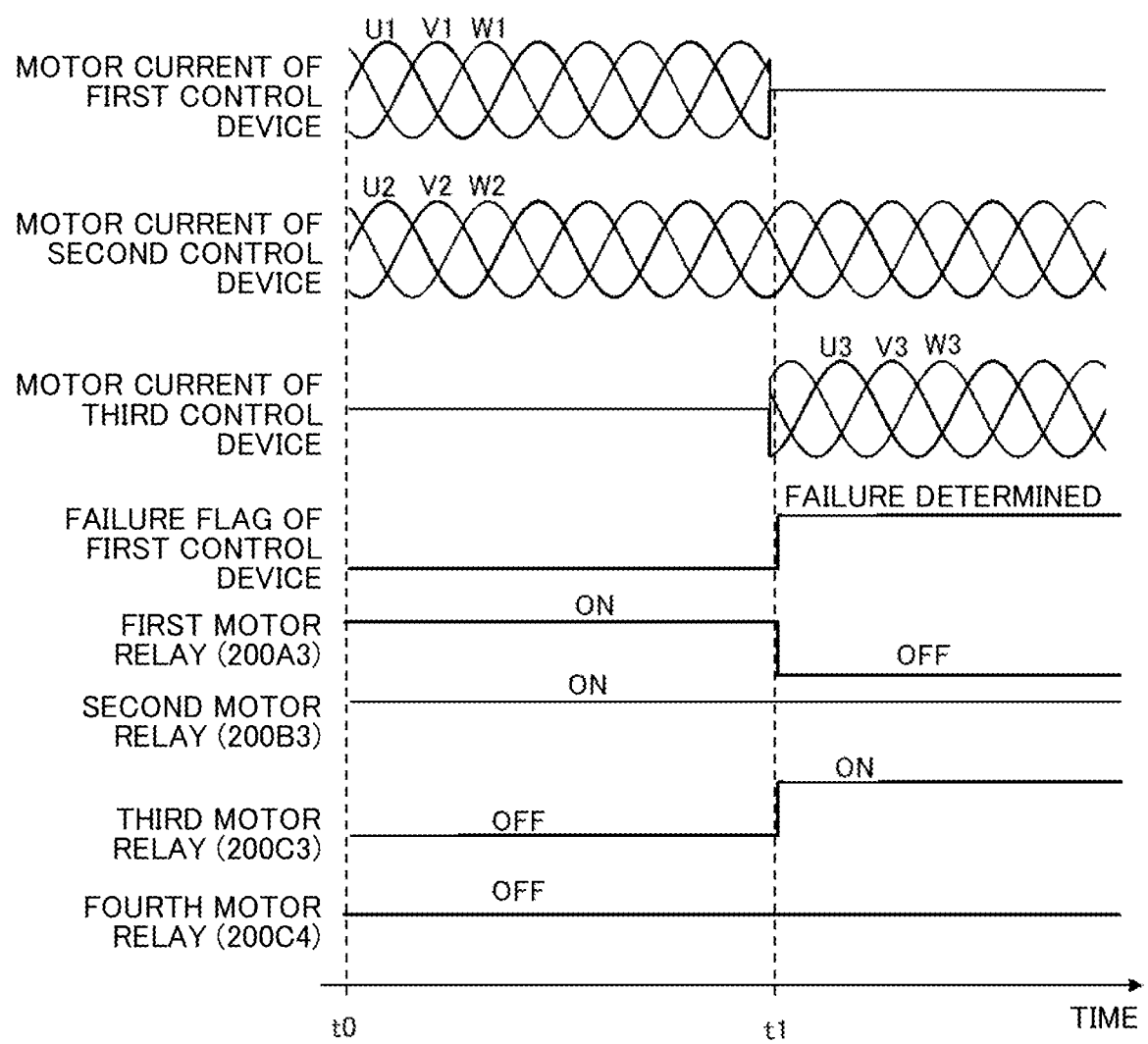
FIG. 7 is a time chart illustrating relay control performed when a failure occurs in the first control device.

FIG. 7 is a time chart illustrating on/off states of relays when a failure occurs in first control device 200A.

During the time between time t0 and time t1, that is, when first control device 200A and second control device 200B are normal, first relay 200A3 of first control device 200A and second relay 200B3 of second control device 200B are maintained on, and third relay 200C3 and fourth relay 200C4 of third control device 200C are maintained off.

That is, when first control device 200A and second control device 200B are normal, the relays are controlled such that first control device 200A can control the current to first winding set 100a, and such that second control device 200B can control the current to second winding set 100b.

After this state in which first control device 200A and second control device 200B are normal, a failure occurs in first control device 200A at time t1. As a result, first relay 200A3 of first control device 200A is switched from on to off, and first inverter 200A22 and first winding set 100a are consequently disconnected from each other.

In addition, when a failure occurs in first control device 200A at time t1, third relay 200C3 of third control device 200C is switched from off to on, and third inverter 200C22 and first winding set 100a are consequently connected to each other.

As a result, first control device 200A stops the current control on first winding set 100a. Instead, third control device 200C begins to perform the current control on first winding set 100a.

Thus, even if a failure occurs in first control device 200A, the current control on first winding set 100a is continued in the same way as that performed when first control device 200A is normal, and deterioration in performance of electric power steering apparatus 1000 is prevented.

When first control device 200A and second control device 200B are normal and when the current control on third control device 200C is not needed, third control device 200C operates in a low power consumption mode. However, when a failure occurs in at least one of first control device 200A and second control device 200B, third control device 200C can end the low power consumption mode and begin the current control.

By causing third control device 200C to operate in a low power consumption mode during a stand-by state in which third control device 200C does not perform the current control on electric motor 100, it is possible to reduce the power consumption of third control device 200C during the stand-by state.

For example, as illustrated in the time chart in FIG. 7, when a failure occurs in first control device 200A and when third control device 200C begins to perform the current control on first winding set 100a, if there is a time delay between disconnection of the first inverter 200A22 from first winding set 100a and the start of the current control on first winding set 100a by third control device 200C, a current is temporarily supplied only to second winding set 100b.

In this state in which a current is supplied only to second winding set 100b but not to first winding set 100a, the steering torque of front wheels 2L and 2R generated by electric motor 100 could become insufficient.

Thus, between when first inverter 200A22 and first winding set 100a are disconnected from each other upon occurrence of a failure of first control device 200A and when the third control device 200C begins to perform the current control on first winding set 100a, second control device 200B outputs a greater current to second winding set 100b than the current that second control device 200B outputs when first control device 200A and second control device 200B are normal.

That is, when the current supplied to first winding set 100a is temporarily stopped, second control device 200B increases its current output to second winding set 100b, whereby a drop in steering torque can be prevented.

When third control device 200C begins to perform the current control on second winding set 100b upon occurrence of a failure in second control device 200B, and when the current supplied to second winding set 100b is temporarily stopped, first control device 200A increases its current output to first winding set 100a.

In addition, first MCU 200A1 of first control device 200A and second MCU 200B1 of second control device 200B may each be a multi-core MCU including a plurality of processor cores. Third MCU 200C1 of third control device 200C may be a multi-core MCU including fewer processor cores than those of first MCU 200A1 and second MCU 200B1 or may be a single-core MCU.

By forming first MCU 200A1 and second MCU 200B1 as multi-core MCUs having high processing capabilities, first control device 200A and second control device 200B can exhibit high performance in their normal motor control.

In contrast, by allowing third MCU 200C1 of third control device 200C, which is provided in case a failure occurs in first control device 200A or second control device 200B, to have fewer processor cores than those first MCU 200A1 and second MCU 200B1, cost reduction can be achieved for third MCU 200C1.

In addition, when all of first control device 200A, second control device 200B, and third control device 200C are normal, third control device 200C may be periodically connected to first winding set 100a or second winding set 100b, in place of first control device 200A or second control device 200B, so as to allow third control device 200C to perform the current control.

For example, a first control pattern in which first control device 200A controls the current supplied to first winding set 100a and second control device 200B controls the current supplied to second winding set 100b, a second control pattern in which first control device 200A controls the current supplied to first winding set 100a and third control device 200C controls the current supplied to second winding set 100b, and a third control pattern in which third control device 200C controls the current supplied to first winding set 100a and second control device 200B controls the current supplied to second winding set 100b may be switched per predetermined time.

Among control devices 200A, 200B, and 200C, a pair of control devices for controlling the current supplied to first winding set 100a and the current supplied to second winding set 100b may be periodically switched. In this way, compared with the case in which first control device 200A and second control device 200B are fixedly used for the current control, the control operation time of each of control devices 200A, 200B, and 200C can be reduced, and the failure rate of control devices 200A, 200B, and 200C with respect to the operation time of vehicle 1 can be reduced.

When the connection process for periodically switching, among control devices 200A, 200B, and 200C, the pair of control devices for controlling the current supplied to first winding set 100a and the current supplied to second winding set 100b is performed as described above, a control device that is disconnected from first winding set 100*a* and second winding set 100*b* and that does not perform the current control may be operated in a low power consumption mode. When the control device that has been operated in the low power consumption mode is connected to first winding set 100*a* or second winding set 100*b* based on the periodic switching or based on detection of a failure of any one of the control devices that have performed the current control, this control device ends the low power consumption mode.

In this way, the power consumption of control devices 200A, 200B, and 200C can be reduced.

The individual technical concepts described in the above-described example can be appropriately combined and used, as long as there is no conflict.

In addition, although the present invention has thus been described in detail with reference to a preferable example, it will be apparent to those skilled in the art that various types of modifications are possible, based on the basic technical concepts and teachings of the present invention.

For example, the steer-by-wire system may be configured as a system including a back-up mechanism in which steering wheel 500 and front wheels 2L and 2R are mechanically coupled to each other via a clutch or the like.

In addition, the electric power steering apparatus is not limited to steer-by-wire. The electric power steering apparatus may be a system in which a steering wheel and steered road wheels are mechanically coupled to each other and which includes an electric motor that generates turning force.

In addition, the actuators are not limited to electric motors. Examples of the actuators include solenoids.

In addition, the steering control device may include four or more control devices, each of which includes an MCU, a drive circuit, and a relay.

In addition, when the MCUs constituting the first control device, the second control device, and the third control device are multi-core MCUs, a plurality of processor cores may monitor their respective operations.

For example, between a first processor core and a second processor core constituting a dual core, if an abnormality occurs in the first processor core, the second processor core can continue to control the driving of an actuator such as an electric motor and can continue to monitor its pre-driver, inverter, and power supply.

REFERENCE SYMBOL LIST

1 Vehicle
2L, 2R Front wheel (steered road wheels)
11 First battery (first power supply)
12 Second battery (second power supply)
100 Electric motor
100*a* First winding set (first actuator, first electric motor)
100*b* Second winding set (second actuator, second electric motor)
200 Steering control device
200A First control device
200B Second control device
200C Third control device
200A3 First relay
200B3 Second relay
200C3 Third relay
200C4 Fourth relay
1000 Electric power steering apparatus
2000 Steering device
3000 Reaction force generation device

The invention claimed is:

1. An electric power steering apparatus comprising:
a steering device that includes a first actuator and a second actuator and that is capable of steering steered road wheels based on an output of the first actuator and an output of the second actuator; and
a steering control device that is capable of controlling the steering device and that includes
a first control device that is connected to the first actuator and that is capable of controlling the first actuator,
a second control device that is connected to the second actuator and that is capable of controlling the second actuator, and
a third control device that is capable of switching connection to, and disconnection from, at least one of the first actuator and the second actuator,
wherein, when a failure of the first control device is detected, the first control device is disconnected from the first actuator, and the third control device is connected to the first actuator, and
wherein, when a failure of the second control device is detected, the second control device is disconnected from the second actuator, and the third control device is connected to the second actuator.

2. The electric power steering apparatus according to claim 1,
wherein the first actuator is a first electric motor having a first winding set, which is a stator with three-phase windings,
wherein the second actuator is a second electric motor having a second winding set, which is a stator with three-phase windings,
wherein the first control device includes a first relay that is capable of switching connection to and disconnection from the first winding set,
wherein the second control device includes a second relay that is capable of switching connection to, and disconnection from, the second winding set, and
wherein the third control device includes a third relay that is capable of switching connection to, and disconnection from, the first winding set, and includes a fourth relay that is capable of switching connection to, and disconnection from, the second winding set.

3. The electric power steering apparatus according to claim 2,
wherein power is suppled from a first power supply to a first inverter of the first control device,
wherein power is supplied from a second power supply to a second inverter of the second control device, and
wherein power is supplied from at least one of the first power supply and the second power supply to a third inverter of the third control device.

4. The electric power steering apparatus according to claim 2,
wherein, when the first control device and the second control device are normal, the third control device operates in a low power consumption mode, and
wherein, between the first control device and the second control device, when a failure occurs in at least the first control device, the third control device ends the low power consumption mode, connects to the first electric motor, and controls the first electric motor.

5. The electric power steering apparatus according to claim 4,
wherein, when a failure occurs in the first control device and when the second control device is normal, the second control device outputs a greater current than a current that the second control device outputs when the first control device and the second control device are normal until the third control device is connected to the first electric motor and begins to control the first electric motor.

6. The electric power steering apparatus according to claim 2,
wherein the first control device monitors a failure of a first pre-driver that outputs a drive signal based on a control signal from the first control device, a failure of a first inverter that controls the first electric motor based on the drive signal from the first pre-driver, and a failure of a first power supply that supplies power to the first inverter and the first pre-driver, and
wherein the second control device monitors a failure of a second pre-driver that outputs a drive signal based on a control signal from the second control device, a failure of a second inverter that controls the second electric motor based on the drive signal from the second pre-driver, and a failure of a second power supply that supplies power to the second inverter and the second pre-driver.

7. The electric power steering apparatus according to claim 2, wherein the third control device monitors a failure of a third pre-driver that outputs a drive signal based on a control signal from the third control device, a failure of a third inverter that controls the first electric motor or the second electric motor based on the drive signal from the third pre-driver, and a failure of a third power supply that supplies power to the third pre-driver and the third inverter.

8. The electric power steering apparatus according to claim 7, wherein when a power supply of a vehicle in which the electric power steering apparatus is installed is turned on, the third control device monitors a failure of the third pre-driver, a failure of the third inverter, and a failure of the third power supply.

9. The electric power steering apparatus according to claim 7, wherein when a power supply of a vehicle in which the electric power steering apparatus is installed is turned off, the third control device monitors a failure of the third pre-driver, a failure of the third inverter, and a failure of the third power supply.

10. The electric power steering apparatus according to claim 2, wherein the third control device monitors a failure of at least one of the first control device and the second control device.

11. The electric power steering apparatus according to claim 10, wherein the third control device monitors a failure of at least one of the first control device and the second control device by communicating with the first control device or the second control device or by detecting an output voltage of an inverter of the first control device or an output voltage of an inverter of the second control device.

12. The electric power steering apparatus according to claim 10, wherein, when a failure of the first control device is detected, the third control device outputs a signal for disconnecting the first control device from the first winding set to the first relay, and outputs a signal for connecting the third control device to the first winding set to the third relay.

13. The electric power steering apparatus according to claim 2, wherein when the first control device, the second control device, and the third control device are normal, the third control device is periodically connected to the first electric motor or the second electric motor, in place of the first control device or the second control device.

14. The electric power steering apparatus according to claim 13,
wherein, when any one of the first control device, the second control device, and the third control device is disconnected from the first electric motor and the second electric motor, this one of the first control device, the second control device, and the third control device operates in a low power consumption mode, and
wherein, when the one of the first control device, the second control device, and the third control device is connected to at least one of the first electric motor and the second electric motor based on the periodic connection process or based on detection of a failure of either of the other two control devices, the one of the first control device, the second control device, and the third control device ends the low power consumption mode.

15. The electric power steering apparatus according to claim 2, when a failure of the first control device and a failure of the second control device are detected, the first control device is disconnected from the first electric motor, the second control device is disconnected from the second electric motor, and the third control device is connected to the first electric motor and the second electric motor.

16. The electric power steering apparatus according to claim 15, wherein, when the third control device is connected to the first electric motor and the second electric motor, the third control device outputs a greater motor current value than a motor current value that the third control device outputs when the third control device is connected to one of the first electric motor and the second electric motor.

17. The electric power steering apparatus according to claim 2,
wherein the first control device and the second control device each include a plurality of processor cores, and
wherein the third control device includes fewer processor cores than those included in each of the first control device and the second control device.

18. The electric power steering apparatus according to claim 2,
wherein the electric power steering apparatus is a steer-by-wire system for a vehicle,
wherein the steer-by-wire system includes the steering device and a reaction force generation device that is capable of adding reaction force torque to a steering wheel, and
wherein the steering device and the reaction force generation device are mechanically separate from each other.

19. An electric power steering apparatus control method for controlling an electric power steering apparatus including a steering device that includes a first actuator and a second actuator and that is capable of steering steered road wheels based on an output of the first actuator and an output of the second actuator, a first control device that is connected to the first actuator and that is capable of controlling the first actuator, a second control device that is connected to the second actuator and that is capable of controlling the second actuator, and a third control device that is capable of switching connection to, and disconnection from, at least one of the first actuator and the second actuator, the electric power steering apparatus control method comprising:
disconnecting, when a failure occurs in the first control device, the first control device from the first actuator, and connecting the third control device to the first actuator; and disconnecting, when a failure occurs in the second control device, the second control device from the second actuator, and connecting the third control device to the second actuator.

20. A steering control device capable of controlling the first actuator and the second actuator installed in a steering device capable of steering steered road wheels, the steering control device comprising:
- a first drive circuit that is connected to the first actuator;
- a first control device that is capable of controlling the first drive circuit;
- a second drive circuit that is connected to the second actuator;
- a second control device that is capable of controlling the second drive circuit;
- a third drive circuit that is connected to the first actuator and the second actuator; and
- a third control device that is capable of switching connection and disconnection among the first actuator, the second actuator, the first drive circuit, the second drive circuit, and the third drive circuit,
- wherein when a failure occurs in the first control device, the third control device disconnects the first drive circuit from the first actuator, and connects the third drive circuit to the first actuator, and
- wherein when a failure occurs in the second control device, the third control device disconnects the second drive circuit from the second actuator, and connects the third drive circuit to the second actuator.

* * * * *